US010486554B2

(12) United States Patent
Napau et al.

(10) Patent No.: US 10,486,554 B2
(45) Date of Patent: Nov. 26, 2019

(54) POWER SEAT LENGTH ADJUSTER ASSEMBLY AND METHOD OF MANUFACTURE

(71) Applicant: Fisher & Company, Incorporated, St. Clair Shores, MI (US)

(72) Inventors: Mircea Napau, Sterling Heights, MI (US); Doina Napau, Sterling Heights, MI (US); Ileana Dacia Napau, Cugir (RO); Ioan Napau, Rochester Hills, MI (US); Dean Lenane, Grosse Pointe Woods, MI (US); Matthew Essian, Clinton Township, MI (US); Antal Teer, Millbrook, AL (US); Sapan Poptani, Northville, MI (US)

(73) Assignee: FISHER & COMPANY, INC., St. Clair Shores, MI (US)

( * ) Notice: Subject to any disclaimer, the term of this patent is extended or adjusted under 35 U.S.C. 154(b) by 26 days.

(21) Appl. No.: 15/680,363

(22) Filed: Aug. 18, 2017

(65) Prior Publication Data
US 2018/0065507 A1 Mar. 8, 2018

Related U.S. Application Data

(60) Provisional application No. 62/385,000, filed on Sep. 8, 2016.

(51) Int. Cl.
*B60N 2/06* (2006.01)
*B60N 2/02* (2006.01)
*B60N 2/07* (2006.01)

(52) U.S. Cl.
CPC ............ *B60N 2/0232* (2013.01); *B60N 2/06* (2013.01); *B60N 2/067* (2013.01); *B60N 2/0705* (2013.01);

(Continued)

(58) Field of Classification Search
CPC ........ B60N 2/0232; B60N 2/06; B60N 2/067; B60N 2/0705; B60N 2/0715; B60N 2002/0236

See application file for complete search history.

(56) References Cited

U.S. PATENT DOCUMENTS

| 657,542 A | 9/1900 | Ingersoll |
| 5,222,402 A | 6/1993 | White et al. |

(Continued)

FOREIGN PATENT DOCUMENTS

| DE | 1755740 A1 | 1/1972 |
| DE | 19815283 A1 | 10/1999 |

(Continued)

OTHER PUBLICATIONS

German Patent and Trademark Office, Office Action for DE Application No. 102017008036.4, dated Apr. 5, 2018.

(Continued)

*Primary Examiner* — Philip F Gabler
(74) *Attorney, Agent, or Firm* — Honigman LLP; Matthew H. Szalach; Jonathan P. O'Brien

(57) ABSTRACT

A seat adjustment assembly includes a housing, a worm, a gear, and a rail. The worm is disposed within the housing for rotation about a first axis and including a helical thread defining an arcuate profile extending about the first axis. The gear is disposed within the housing for rotation about a second axis and is meshingly-engaged with the worm. The rail extends through the housing and the gear for rotation about a third axis. The rail is meshingly-engaged with the gear.

20 Claims, 9 Drawing Sheets

(52) U.S. Cl.
CPC .... *B60N 2/0715* (2013.01); *B60N 2002/0236* (2013.01)

(56) References Cited

U.S. PATENT DOCUMENTS

| | | | |
|---|---|---|---|
| 5,349,878 | A | 9/1994 | White et al. |
| 6,138,974 | A | 10/2000 | Okada et al. |
| 6,260,922 | B1 | 7/2001 | Frohnhaus et al. |
| 7,051,986 | B1 | 5/2006 | Taubmann et al. |
| 7,143,513 | B2 | 12/2006 | Taubmann et al. |
| 7,313,982 | B2 * | 1/2008 | Wisner ................ B60N 2/0232 192/38 |
| 7,340,974 | B2 | 3/2008 | Landskron et al. |
| 8,113,074 | B2 | 2/2012 | Wohrle et al. |
| 8,453,529 | B2 * | 6/2013 | Birker .................... B60N 2/067 248/429 |
| 8,485,489 | B2 | 7/2013 | Hofschulte et al. |
| 8,826,756 | B2 * | 9/2014 | Hoffmann ........... B29C 45/1671 74/89.34 |
| 8,904,895 | B2 * | 12/2014 | Woehrle .................... F16H 1/16 74/425 |
| 9,180,795 | B2 | 11/2015 | Flieger et al. |
| 9,205,763 | B2 | 12/2015 | Anticuar et al. |
| 9,415,713 | B2 * | 8/2016 | Line ....................... B60N 2/643 |
| 2004/0206195 | A1 | 10/2004 | Landskron et al. |
| 2006/0213302 | A1 | 9/2006 | Hoffmann et al. |
| 2006/0249644 | A1 | 11/2006 | Folliot et al. |
| 2011/0079699 | A1 | 4/2011 | Tarusawa et al. |
| 2012/0325033 | A1 | 12/2012 | Bosecker et al. |
| 2015/0210187 | A1 | 7/2015 | Harleb et al. |
| 2015/0360587 | A1 * | 12/2015 | Hoffmann ............ B60N 2/0232 248/429 |

FOREIGN PATENT DOCUMENTS

| | | |
|---|---|---|
| DE | 10203983 B4 | 5/2004 |
| DE | 102005044467 B3 | 3/2007 |
| DE | 10362326 B4 | 2/2014 |
| EP | 1068093 A1 | 1/2001 |
| EP | 1442923 A2 | 8/2004 |
| FR | 2872747 A1 | 1/2006 |
| FR | 2882975 A1 | 9/2006 |
| KR | 101501384 B1 | 3/2015 |
| WO | WO-8606036 A1 | 10/1986 |
| WO | WO-2009/092946 A2 | 7/2009 |
| WO | WO-2011/098161 A1 | 8/2011 |
| WO | WO-2015161714 A1 | 10/2015 |

OTHER PUBLICATIONS

Korean Intellectual Property Office, Office Action for KR Application No. 10-2107-0114314, dated Mar. 27, 2019.

* cited by examiner

POWER SEAT LENGTH ADJUSTER ASSEMBLY AND METHOD OF MANUFACTURE

CROSS REFERENCE TO RELATED APPLICATIONS

This U.S. patent application claims priority under 35 U.S.C. § 119(e) to U.S. Provisional Application 62/385,000, filed on Sep. 8, 2016, the disclosure of which is considered part of the disclosure of this application and is hereby incorporated by reference in its entirety.

FIELD

The present disclosure relates generally to a seat track assembly and more particularly to a power seat length adjuster assembly having an improved gear drive and spindle drive actuation for adjusting a longitudinal position of a vehicle seat, and to a method of manufacturing a power seat length adjuster assembly.

BACKGROUND

This section provides background information related to the present disclosure and is not necessarily prior art.

Vehicles such as automobiles, for example, typically include at least one seat assembly that is movable in one or more directions (e.g., fore-aft, up-down, angular orientation, etc.) relative to a portion (e.g., a floor pan) of the vehicle in order to accommodate occupants of different size and height as well as to provide a comfortable seating position to suit the occupant's preference. Such seat assemblies often include at least one track assembly having an adjustment mechanism that allows the occupant or other user to move the seat assembly relative to the floor pan. Such adjustment mechanisms may be manually or electrically operated.

A manually operated adjustment mechanism commonly employs a rotatable knob or a lever that is manually pushed or pulled by the user to adjust the height and tilt position of the seat assembly, and a lever that is pushed or pulled by the user to adjust the seat fore and aft position of the seat assembly. An electrically operated adjustment mechanism commonly employs a bi-directional electric motor that rotates at an angular velocity as high as 3,000 revolutions per minute driving a worm member engaging a mating worm gear rigidly coupled to a driven nut that threadingly engages the threads of a fixed spindle shaft, forcing the nut and the housing subassembly in which the nut is rotated to translate fore-and-aft along the spindle shaft axis. Such worm gear drives may be sensitive to misalignment, and, further, may generate, propagate, and transmit undesirable vibrations and noise to the seat assembly and other portions of the vehicle. The entire driving mechanism consisting of the worm gear drive is mounted in a rigid housing, secured to an adjustment assembly that must minimize its axial displacement should a force of a predetermined magnitude be applied thereto. Accordingly, while conventional seat assemblies, including seat track and adjustment assemblies, allow a user to adjust the longitudinal position of the seat assembly relative to the vehicle floor pan, a continuous need for improvement in the relevant art remains.

SUMMARY

This section provides a general summary of the disclosure, and is not a comprehensive disclosure of its full scope or all of its features.

Typically, in an arrangement pursued by this patent application, a power operated seat length adjuster is actuated by an occupant controlled switch and includes a bi-directional electric motor, mounted centrally or intermediately between a vehicle seat pair of track assemblies, that rotates two flex drive shafts extending outwardly from the motor to two gearbox blocks fixedly mounted inside of an upper track assembly. Each gearbox block includes a drive assembly having a worm and a corresponding helical gear or a worm gear. The drive member, e.g. the worm, may be actuated through the flex drive shaft and the driven member may be integral with an inner threaded spindle nut. Each drive assembly may include the rotatable spindle nut that threadingly receives a lead screw extending longitudinally along and fixed to a lower track assembly. Through these two drive assemblies, the electric motor rotational movement may be orthogonally offset to move the upper tracks in the fore-aft directions relative to the lower tracks, along spindle screw axes. The vehicle seat may be attached to a frame supported by the pair of upper tracks disposed parallel to one another, while the pair of lower tracks may be fastened to the vehicle chassis. The upper and lower tracks may have the shape described by U.S. Pat. No. 9,205,763 B2, the disclosure of which is hereby incorporated by reference in its entirety. Two drive shafts, gear boxes, lead screws and drive nuts may be employed in a power length adjuster drive for each seat track assembly, and may be driven by a bi-directional electric motor.

According to one aspect, a power seat length adjustment assembly for a vehicle seat is provided. The adjustment assembly may include a cylindrical worm and a helical gear drive. The use of such a configuration has the advantage conferred by a theoretical point contact between the worm starts and helical gear teeth flanks surfaces, e.g., their mesh is insensitive to any axial misalignment of the spindle nut caused by assembly, component tolerances, and wear of the individual components. In addition, the cost of manufacturing and assembly of such a gear drive is reduced. Thus, the configuration of an open teeth space at both side ends of such a gear results in the fact that tooth roots of the driven helical gear teeth extend up to the end face at which spindle nut annular projections project. In order to avoid any damage to the bearing bushings contacting the interrupted end faces, while at the same time ensuring optimum support of helical gear bearing surfaces in bearing bushings of housing plates, thrust washers are inserted over spindle nut bearing projections, being placed against the both end faces of the helical driven gear. In order to prevent these thrust washers from sliding circumferentially, anti-rotation features or tabs engage the helical driven gear teeth spaces. The tabs increase the fabrication and assembly cost for this type of gear drive subassembly. Moreover, thrust washers produce undesirable noises, especially when changing the direction of spindle nut axial travel along the spindle screw axis. When these thrust washers are used, specifically, rattling noises and frictional noises are produced which are caused by deviations in concentricity and shaft-center-distance tolerances. In addition, the axial play of the spindle nut within the housing is increased by the summation of individual tolerances. An additional teeth deburring operation is also required on both side ends of the driven helical gear with direct implications on manufacturing cost increase.

According to another aspect, a power seat length adjustment assembly for a vehicle seat is provided that may include a cylindrical worm with longitudinally crowned flank surfaces of its helical threads, in mesh with the teeth of a single-enveloping worm gear drive. Such a single-enveloping worm gear can have its side end faces of the space between the teeth not interrupted, but rather such that at least one complete annular surface remains at both ends of driven worm gear, thus eliminating the necessity of an additional debburing operation of its teeth. A classical single-enveloping worm gear, manufactured by a hobbing process using a hob with its pitch diameter identical with the pitch diameter of the driving worm and at a center distance identical to the functional center distance of the worm-worm gear drive provides a line contact at every instant between the worm threads surfaces and conjugate single-enveloping worm gear teeth surfaces. The line contact at every instant between the worm threads and mating worm gear teeth surfaces is sensitive to any errors and misalignments of component axes and center distance variation, causing an unacceptable shift of the bearing contact to the edges of the tooth and large transmission errors of unfavorable shape and subsequently vibrations. In addition, a proper complete oil film formation on contact surfaces is not possible. A variant of this type of single-enveloping worm gear drive is proposed, by mismatching the flank surfaces in contact using crowning operations during the manufacturing process of both components (e.g., the worm and the single-enveloping worm gear), such that their contact is altered from a theoretical line contact at every instant to a theoretical point contact at every instant. Thus, the worm threads surfaces are longitudinally crowned, by a plunging move such that the worm pitch surface deviates from a theoretical cylindrical surface to a parabolic surface having a barrel shape. The amount of hob oversize is established by a 3D virtual simulation method of the single-enveloping worm gear manufacturing, assembly and operating process to assess the proper bearing contact on the single-enveloping worm gear tooth surface. Similar, the amount of worm pitch surface parabolic crowning is established by a correlation with the gear drive subassembly admissible transmission error. As such, their mesh is less sensitive to errors of manufacturing, assembly and operation. In reality, under the load, the theoretical point contact pattern becomes an ellipse-shaped contact. Often, in order to increase the length-of-action, the driven single-enveloping worm gear may have a symmetrically throated shape, relative to its face width center line, to wrap around the worm.

According to another aspect, a method of manufacturing a longitudinally crowned plastic worm by an injection molding process and a method of manufacturing a single-enveloping steel worm gear by a hobbing process are also provided. The worm and worm gear may be used in a power seat length adjuster assembly. The method of manufacturing the single-enveloping worm gear may include a hobbing operation that is faster, simpler and more cost-effective using an oversized hob such that the bearing contact, of theoretical point contact type, on the worm gear is optimized in order to reduce the sensitivity to misalignment during assembly and operation. The hobbing operation may also result in worm gear teeth having superior contact surface roughness. The method of manufacturing a longitudinally crowned worm consists of an injection molding process of a worm that has its pitch cylinder altered from a theoretical cylindrical shape to a parabolic barrel shape, such that the contact between the worm threads surfaces and the teeth surfaces of the single-enveloping worm gear is shifted towards its tooth width center line.

According to another aspect, a power seat length adjustment assembly is provided, which may include one or more support members coupled to the upper track in a compressible secured relation. The support member may have a reduced weight while still providing ample strength to withstand severe forces. The support member may also minimize the axial displacement of the adjustment assembly and further balance the axial loads, during the application of severe axial forces on the adjustment assembly.

According to another aspect, a power seat length adjustment assembly is provided. The adjustment assembly may include a housing having noise, vibration, and force-dampening properties.

The worm may be defined by the DIN 3975 standard. In some implementations, the worm may be manufactured by an injection molding process from a plastic material such as PEEK 450G. In some implementations, the worm may include a helical thread that is crowned in a longitudinal direction, while the oversized hob, used for manufacturing the worm gear configured to mate with the worm, may include a helical thread formed without a crown. The longitudinal crowning of the worm thread may localize the theoretical point contact in a central region of each tooth of the worm gear, thus avoiding edge contact between the worm thread and worm gear teeth flanks. Longitudinal crowning of the worm may also provide a parabolic function of negative transmission errors (worm gear flanks lags with respect to the worm thread) that is able to absorb the linear functions of transmission errors and reduce vibrations.

The worm gear, which may be configured to meshingly-engage the worm, may be manufactured from steel by a radial infeed hobbing process, using an oversized hob. The oversized hob may increase the radius of curvature of each worm gear tooth, causing a contact location of each worm gear tooth to be concentrated in the center of the worm gear tooth. The hobbing process of the worm gear teeth, using an oversized hob, may be equivalent to a worm profile crowning with respect to the hob, allowing for a theoretical point contact between the worm thread and the worm gear tooth flank, instead of a line contact. The point contact location may reduce the sensitivity of the worm and worm gear to center distance variation as well as to any misalignment errors during assembly. In addition, using an oversized hob may allow for an increased number of flutes of the hob which considerably improves the quality of the cut surface of the worm gear tooth flank.

In some implementations, the driven worm gear may be of a single-enveloping type instead of a classical driven helical gear. The single-enveloping type worm gear may include one or more continuous annular surfaces, and may allow for the elimination of one or more thrust washers. Such single-enveloping type worm gear may also eliminate the need for a deburring operation of its teeth.

In some implementations, the adjustment assembly may include a pair of planar support members. Each support member may be fixed to an upper wall of the upper track by an orbital riveting process or an orbital welding process. The support members may allow for retaining a portion of the adjustment assembly in a compressible secured relation therebetween. The support members may include one or more protruding ear portions that increase the adjustment assembly's stiffness and resistance to axial loads. The ear portions may engage slots formed in side and/or upper walls of the upper track. The planar support members may improve the isolation of vibrations due to compression of elastic rubber shells that are enveloping the housing blocks therebetween.

In some implementations, the adjustment assembly may include a U-shaped support member having leg portions secured to the upper track by a pair of screws in order to allow for retaining the adjustment assembly in a compressible secured relation therebetween. To limit the relative axial displacement of the adjustment assembly at a certain minimum value in an axial direction of the upper track, arm portions of the U-shaped bracket may include protruding ear portions that engage slots formed in side and/or upper walls of the upper track. The ear portions may increase the stiffness of the upper track and balance the axial loads in the event of a high axial load. It is understood that the upper tracks may have the shape described within U.S. Pat. No. 9,205,763 B2, the disclosure of which is hereby incorporated by reference in its entirety.

According to another aspect, a seat adjustment assembly is provided. The seat adjustment assembly may include a housing, a worm, a gear, and a rail. The worm may be disposed within the housing for rotation about a first axis and may include a helical thread defining an arcuate profile extending about the first axis. The gear may be disposed within the housing for rotation about a second axis and meshingly-engaged with the worm. The rail may extend through the housing and the gear for rotation about a third axis. The rail may be meshingly-engaged with the gear.

In some implementations, the gear includes an inner thread and the rail includes an outer thread meshingly-engaged with the inner thread. The helical thread may define a first diameter, a second diameter, and a third diameter disposed between the first diameter and the second diameter relative to the first axis.

In some implementations, the third diameter is greater than the first diameter and the second diameter.

In some implementations, the housing includes a proximal cover formed from a resilient material and having an aperture, the rail being rotatably disposed within the aperture.

In some implementations, the seat adjustment assembly includes at least one support member engaging the housing. The at least one support member may define a U-shape having a channel. The housing may be disposed within the channel in a friction-fit configuration. The at least one support member may include a first support member and a second support member. The housing may be disposed between the first support member and the second support member in a friction-fit configuration. The at least one support member may include a laterally-extending ear portion and a medially-extending ear portion.

In some implementations, the gear includes a plurality of recesses defining a corresponding plurality of gear teeth. The plurality of gear teeth may define at least one continuous radially-extending surface configured to slidably engage the housing.

In some implementations, the seat adjustment assembly includes a bushing supported by the housing and rotatably coupled to the gear. The bushing may include an anti-rotation feature configured to inhibit rotation of the bushing relative to the housing.

In some implementations, the worm is formed at least in part from a PEEK material.

According to yet another aspect, a seat track assembly is provided. The seat track assembly may include a first track, a second track, and a conveyor. The second track may translatably engage the first track and may include a lateral aperture and a medial aperture. The conveyor may be at least partially disposed within the second track and may include at least one support member having at least one lateral ear disposed within the lateral aperture and at least one medial ear disposed within the medial aperture.

In some implementations, the at least one lateral ear is disposed within the lateral aperture in a press-fit configuration, and the at least one medial ear is disposed within the medial aperture in a press-fit configuration.

In some implementations, the at least one support member defines a U-shape having a channel. The conveyor may include a housing disposed within the channel in a friction-fit configuration.

In some implementations, the at least one support member includes a first support member having a first lateral ear and a first medial ear, and a second support member having a second lateral ear and a second medial ear.

In some implementations, the conveyor includes a housing disposed between the first support member and the second support member in a friction-fit configuration.

In some implementations, the at least one support member includes a retaining feature aligned with an upper aperture of the second track. The retaining feature may include a pin portion disposed within the upper aperture.

According to another aspect, the present disclosure provides a method of manufacturing a worm gear. The method may include rotating a worm gear blank about a first axis. The method may also include rotating a hob in a synchronized relation with the worm gear blank about a second axis. The second axis may be disposed at an acute angle relative to a projection of the second axis passing through an intersection of a centerline of the worm gear blank and a centerline of the hob. The method may further include translating the hob towards the first axis in a direction perpendicular to the first axis and the second axis until an outer diameter of the hob is adjacent to an outer diameter of the worm gear blank. The method may also include cutting worm gear teeth on the worm gear blank.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected configurations and not all possible implementations, and are not intended to limit the scope of the present disclosure.

Figure 4:
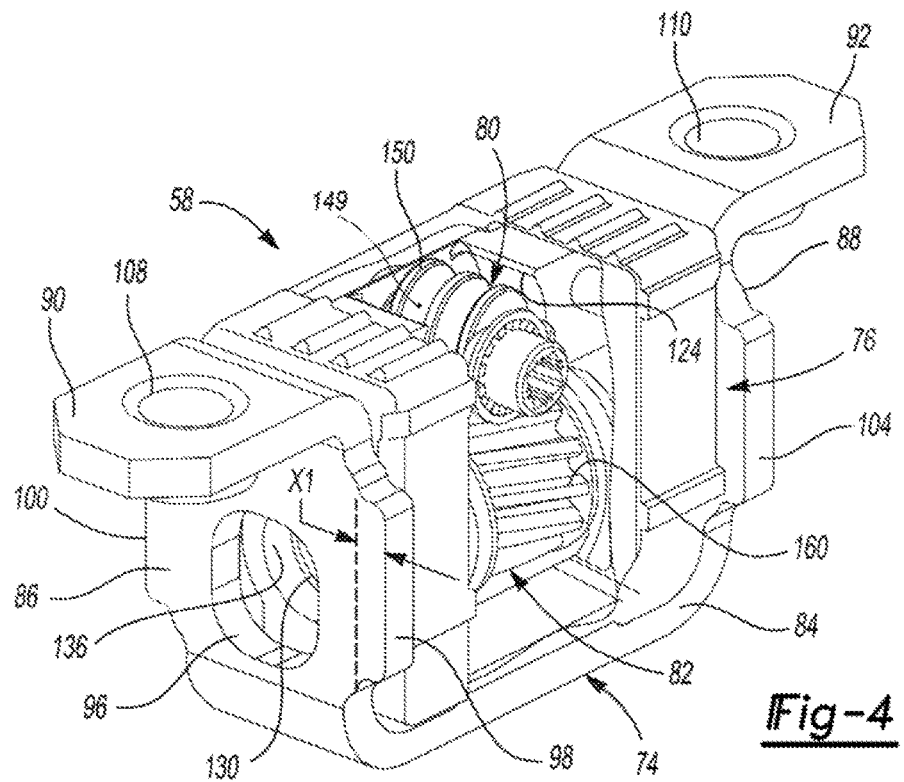
Figure 5:
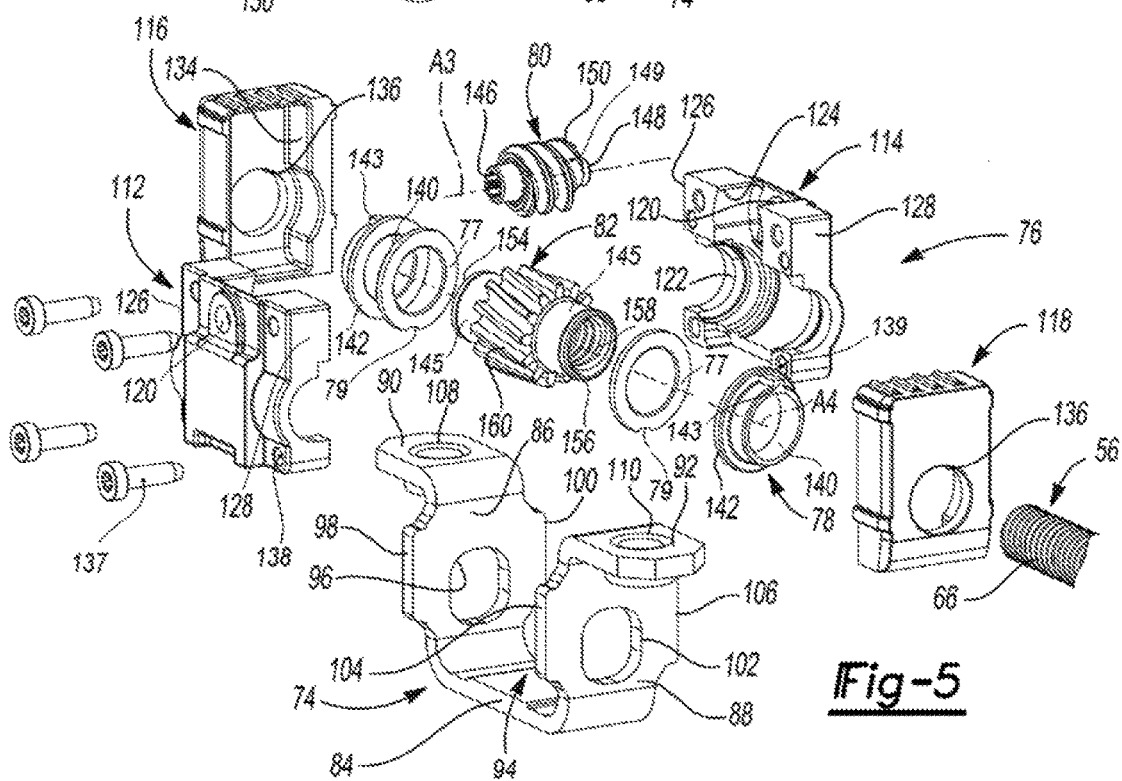
Figure 6:
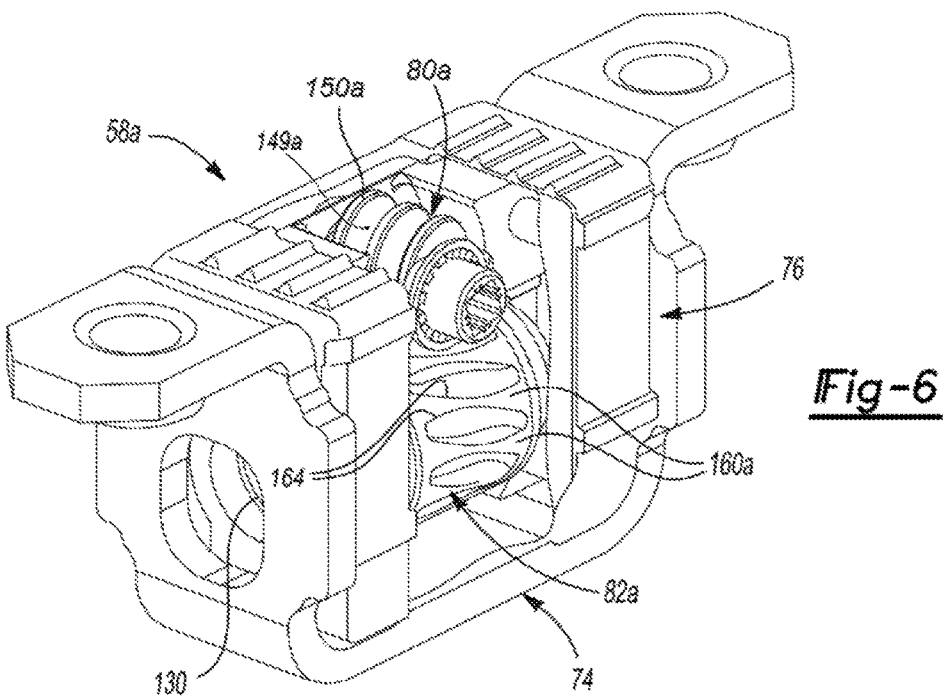
Figure 7:
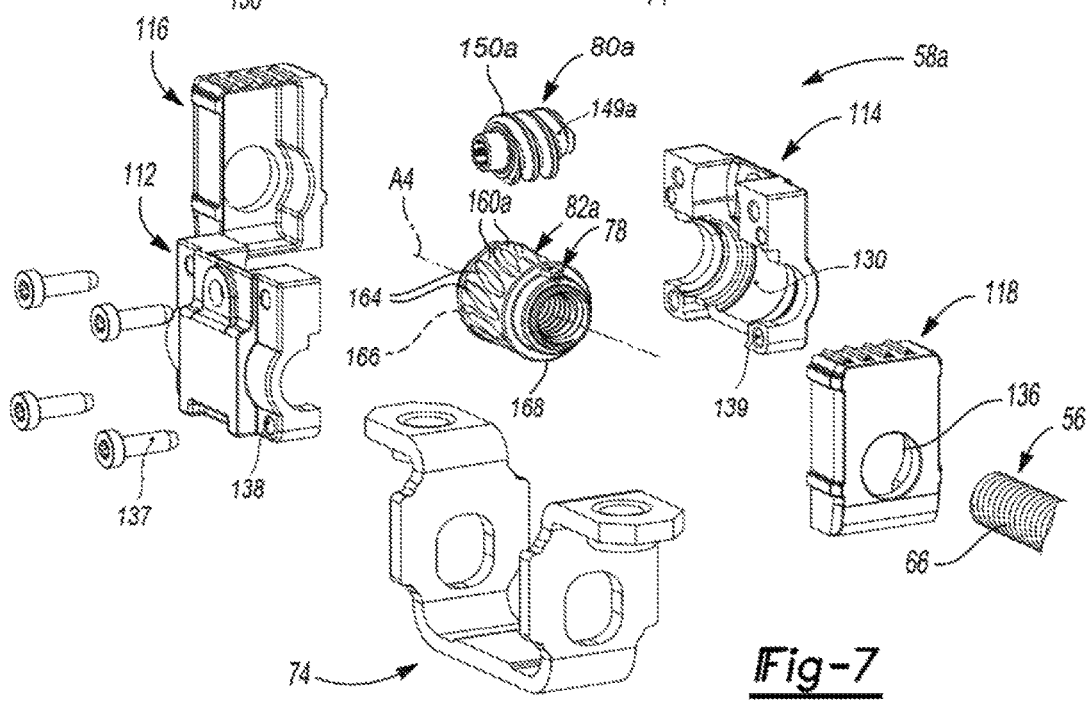
Figure 8:
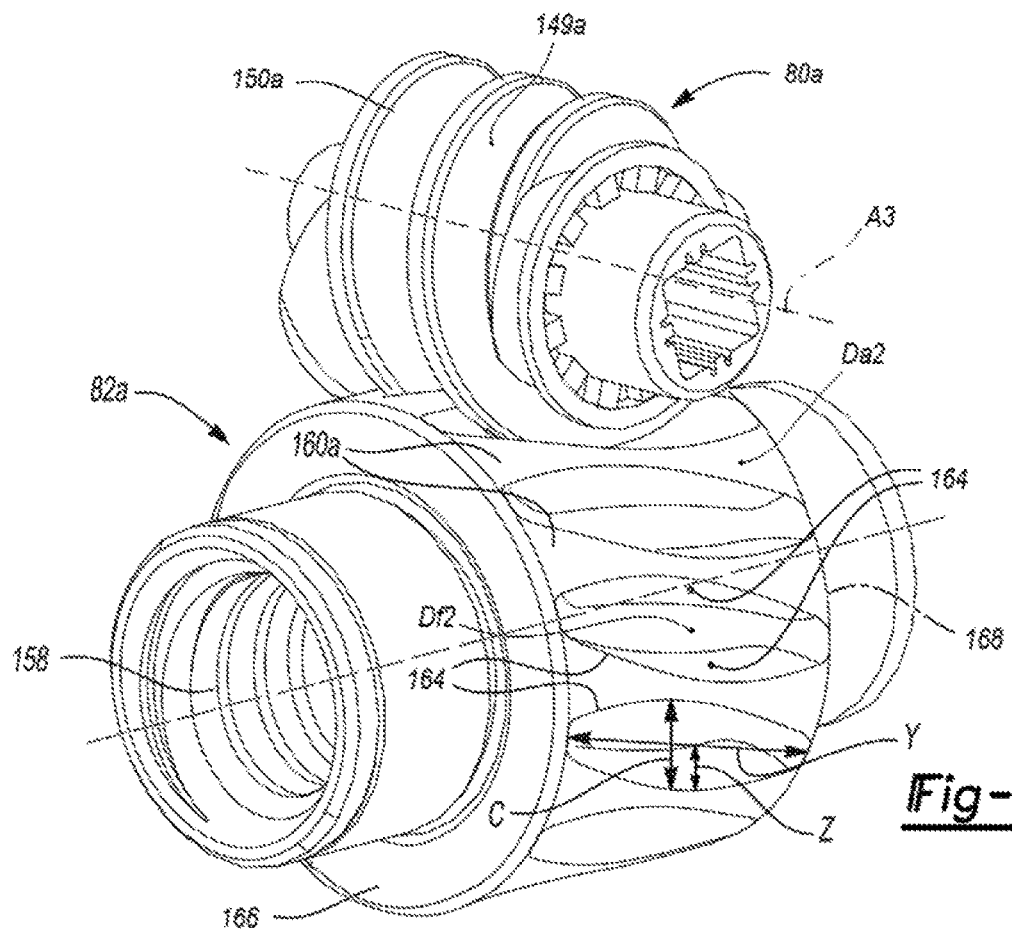
Figure 9:
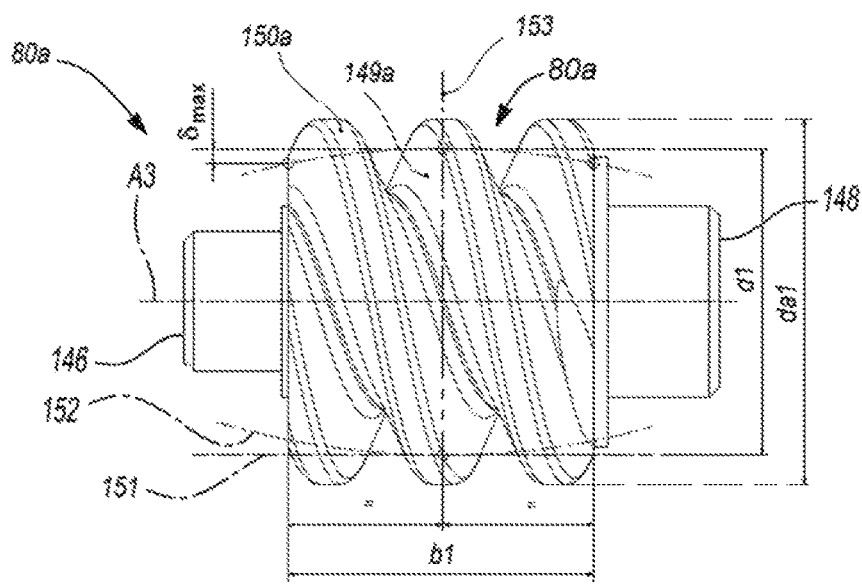
Figures 10, 11, 12:
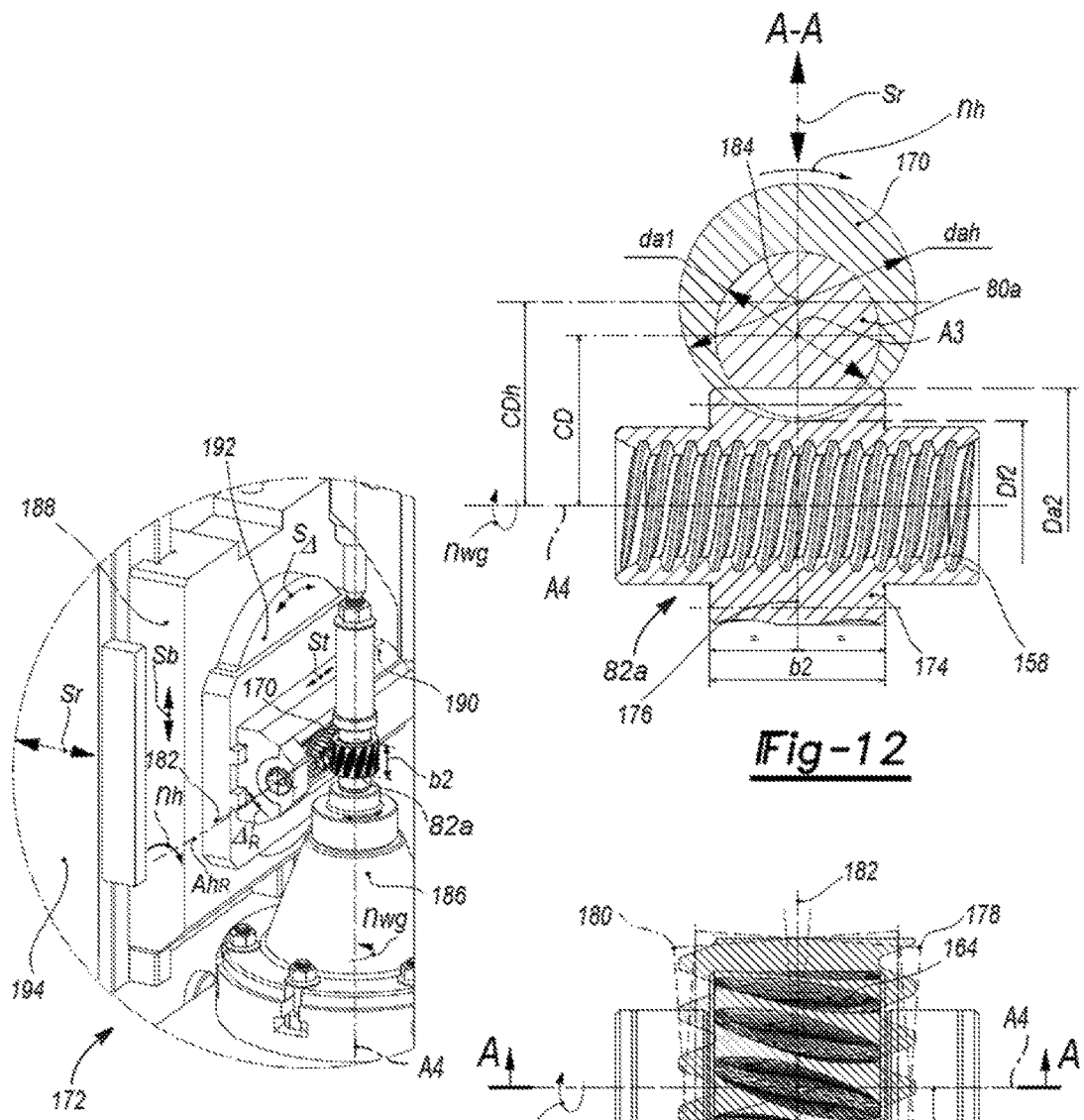
Figure 13A:
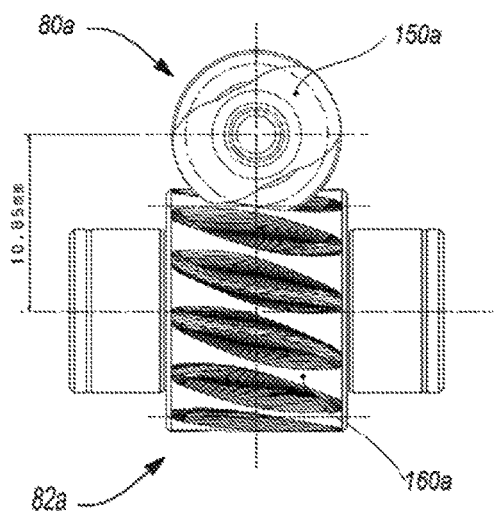
Figure 13B:
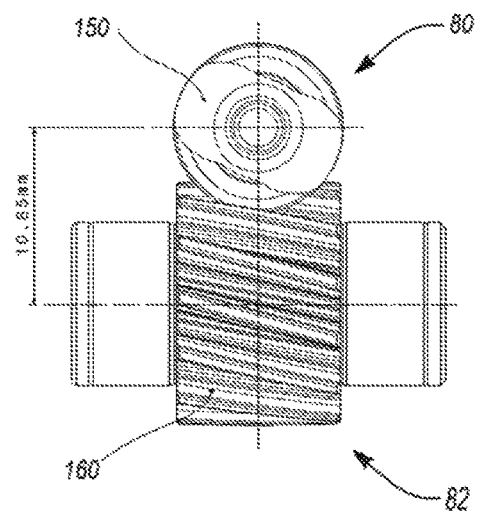
Figure 14A:
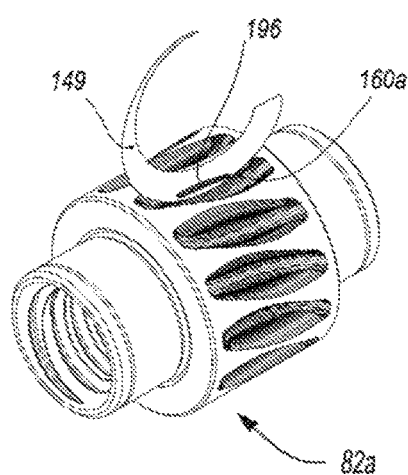
Figure 14B:
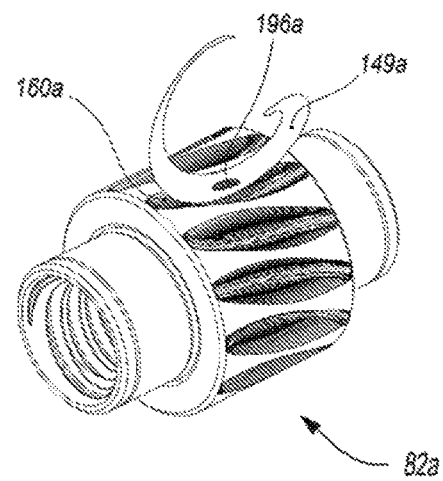
Figure 15:
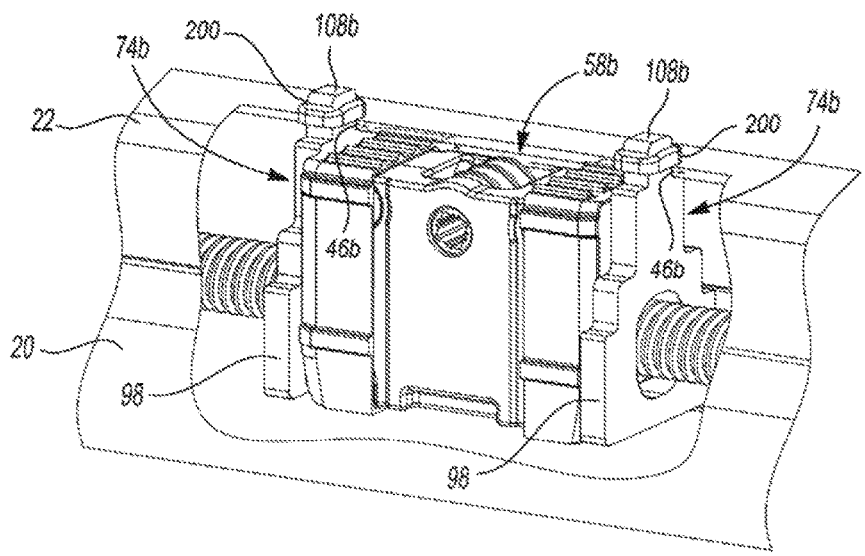
Figure 16:
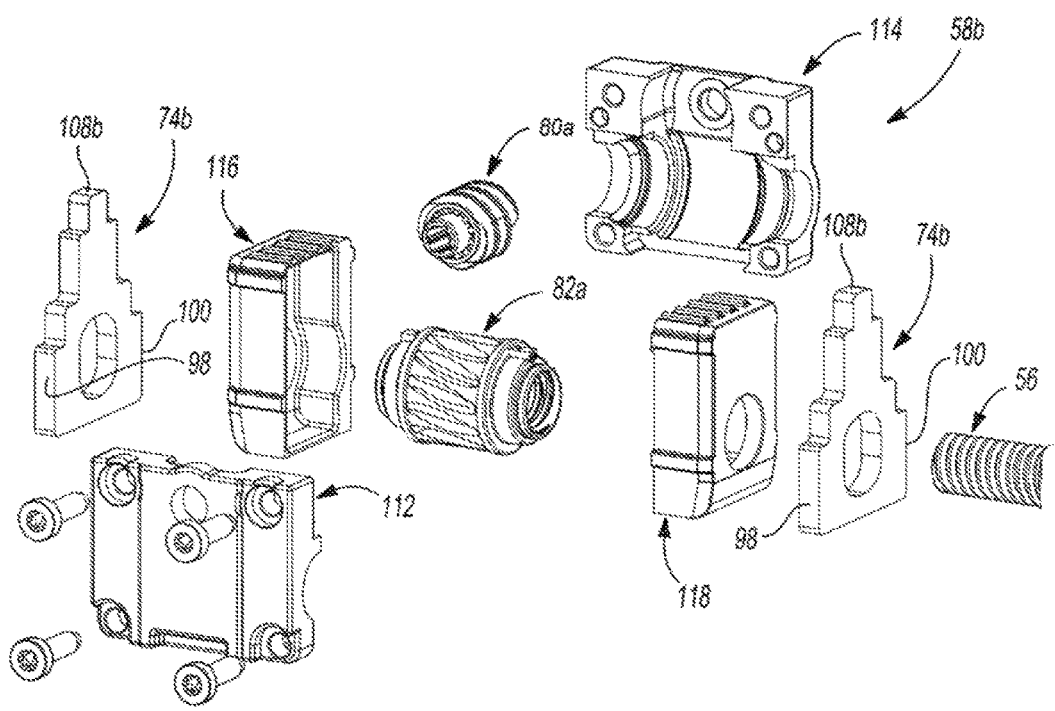
Figure 17:
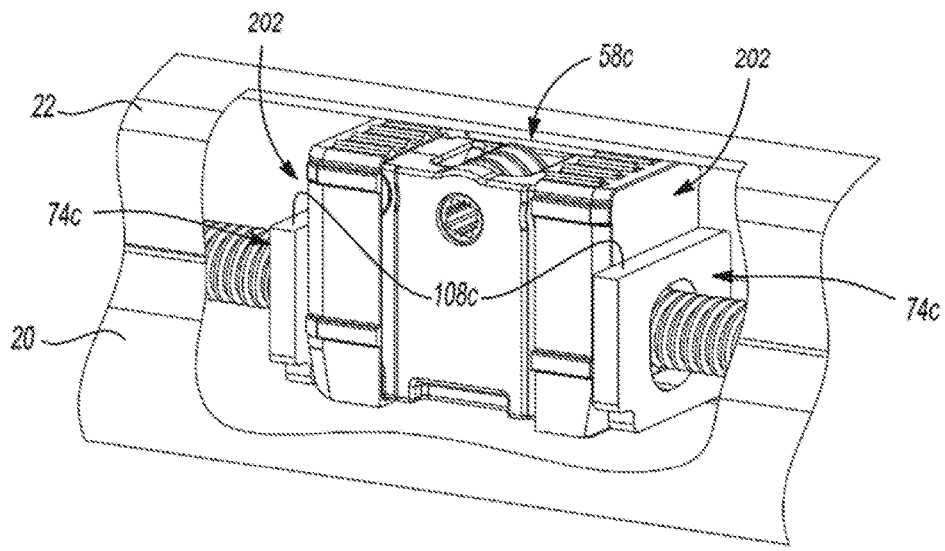
Figure 18:
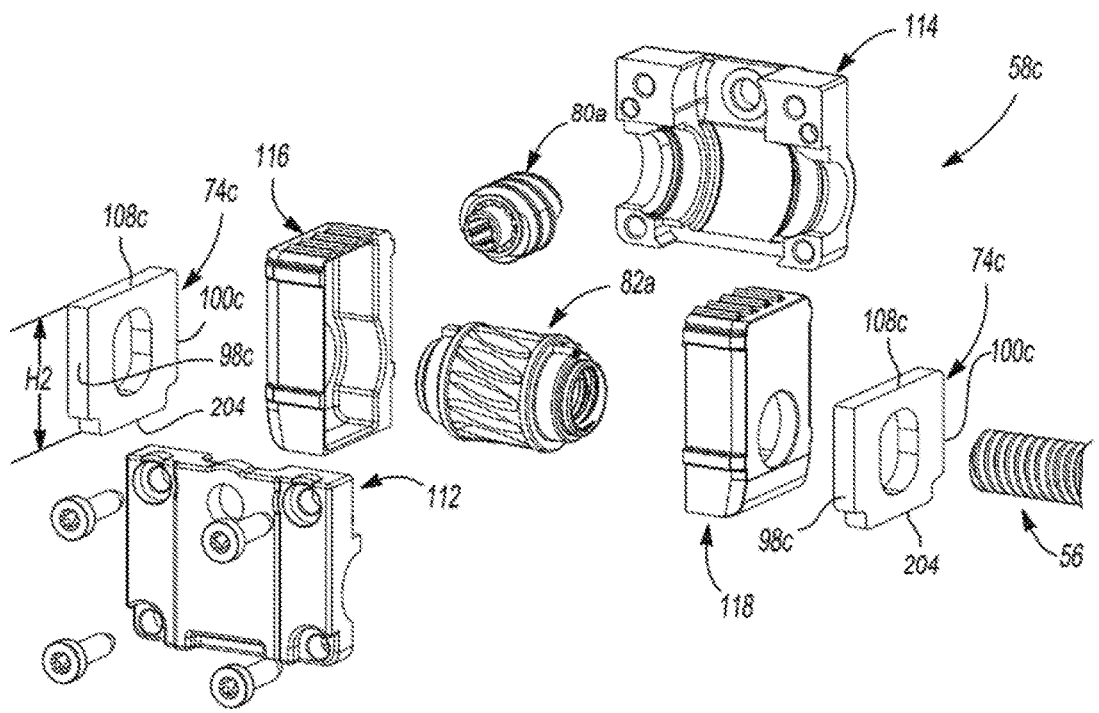

FIG. 4 is a partial perspective view of a power seat length adjuster assembly, including an orthogonal gear drive subassembly having a cylindrical worm in mesh with a mating helical gear, and a spindle screw and spindle nut subassembly, both mounted in a housing secured in a compressible relation to a seat upper track through a U-shaped support member in accordance with the principles of the present disclosure, a portion of the housing and the spindle screw being removed for clarity;

FIG. 5 is an exploded view of the power seat length adjuster assembly illustrated in FIG. 4;

FIG. 6 is a partial perspective view of a power seat length adjuster assembly, including an orthogonal gear drive subassembly having of a longitudinally crowned cylindrical worm in mesh with a mating single-enveloping worm gear, and a spindle screw and spindle nut subassembly, both mounted in a housing secured in a compressible relation to a seat upper track through a U-shaped support member, in accordance with the principles of the present disclosure, a portion of the housing and the spindle screw being removed for clarity;

FIG. 7 is an exploded view of the power seat length adjuster assembly illustrated in FIG. 6;

FIG. 8 is a perspective view of a gear drive subassembly including a longitudinally crowned cylindrical worm in mesh with a mating single-enveloping worm gear manufactured by an oversized hob, in accordance with the principles of the present disclosure;

FIG. 9 is a side view of the longitudinally crowned cylindrical worm, manufactured in accordance with the principles of the present disclosure, illustrated in FIG. 8;

FIG. 10 is a partial perspective view of a single-enveloping worm gear hobbing process on a conventional hobbing machine using an oversized hob and a radial infeed, in accordance with the principles of the present disclosure;

FIG. 11 is a top view of a single-enveloping worm gear having its teeth cut through a hobbing process on a conventional hobbing machine using an oversized hob and a radial infeed, in accordance with the principles of the present disclosure;

FIG. 12 is a partial section view of the single-enveloping worm gear illustrated in FIG. 11, having its teeth cut through a hobbing process on a conventional hobbing machine using an oversized hob and a radial infeed, in accordance with the principles of the present disclosure;

FIG. 13A is a side view of an orthogonal gear drive subassembly mounted at the functional center distance CD for a longitudinally crowned worm and its mating single-enveloping worm gear drive manufactured by an oversized hob, in accordance with the principles of the present disclosure;

FIG. 13B is a side view of an orthogonal gear drive subassembly mounted at the functional center distance CD for a cylindrical worm and its mating helical gear drive, in accordance with the principles of the present disclosure;

FIG. 14A is a perspective view of instantaneous bearing contact patterns between the functional longitudinally crowned worm thread surface in mesh with a single-enveloping worm gear tooth surface having the teeth cut by a hob with a pitch diameter identical to the pitch diameter of the functional worm;

FIG. 14B is a perspective view of instantaneous bearing contact patterns between the functional longitudinally crowned worm thread surface in mesh with a single-enveloping worm gear tooth surface having the teeth cut by an oversized hob, in accordance with the principles of the present disclosure;

FIG. 15 is a perspective partial view of a power seat length adjuster assembly, including an orthogonal gear drive subassembly having a longitudinally crowned cylindrical worm in mesh with a mating single-enveloping worm gear and, a spindle screw and spindle nut subassembly, both mounted in a housing secured in a compressible relation to a seat upper track through a support subassembly, partially received within the elongate slots of the top wall of the upper track and orbitally riveted or laser welded, in accordance with the principles of the present disclosure, a portion of the housing and the spindle screw being removed for clarity;

FIG. 16 is an exploded view of the power seat length adjuster assembly illustrated in FIG. 15;

FIG. 17 is a partial perspective view of a power seat length adjuster assembly, including an orthogonal gear drive subassembly having a longitudinally crowned cylindrical worm in mesh with a mating single-enveloping worm gear and, a spindle screw and spindle nut subassembly, both mounted in a housing secured in a compressible relation to a seat upper track through a support subassembly, partially received within the elongate closed slots of both side walls of the upper track and laser welded, in accordance with the principles of the present disclosure, a portion of the housing and the spindle screw being removed for clarity; and FIG. 18 is an exploded view of the power seat length adjuster assembly illustrated in FIG. 17.

Corresponding reference numerals indicate corresponding parts throughout the drawings.

DETAILED DESCRIPTION

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms first, second, third, etc. may be used herein to describe various embodiments, elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

Figure 1:
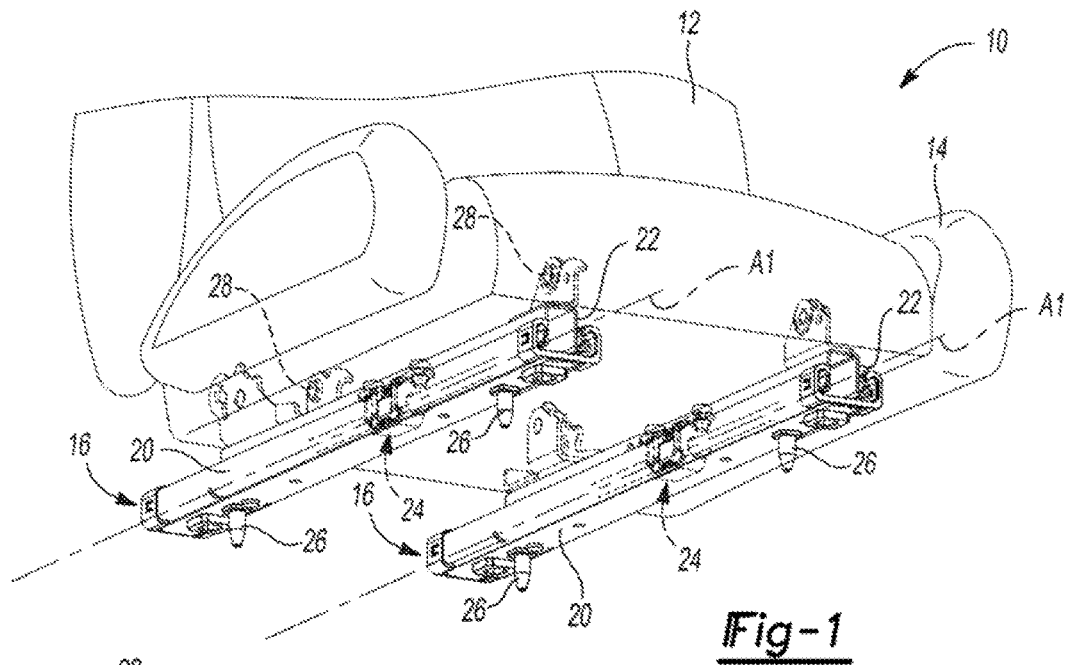
FIG. 1 is a partial perspective view of a vehicle seat assembly having a pair of seat track assemblies, including a power seat length adjuster assembly in accordance with the principles of the present disclosure.

With reference to FIG. 1, a seat assembly 10 is provided and may include a seatback 12, a seat bottom 14, and one or more seat track assemblies 16. In some implementations, the seat assembly 10 is adjustably mounted to a vehicle (not shown), such as an automobile. For example, a reclining mechanism (not shown) may pivotably move the seatback 12 relative to the seat bottom 14, and a pair of seat track assemblies 16 may translatably move the seat bottom 14 to a certain position relative to the vehicle floor pan (not shown). Accordingly, a user may selectively change the orientation of the seatback 12 relative to the seat bottom 14 using the reclining mechanism (not shown), and the position of the seat assembly 10 relative to the vehicle floor pan using the pair of seat track assemblies 16.

Figure 2:
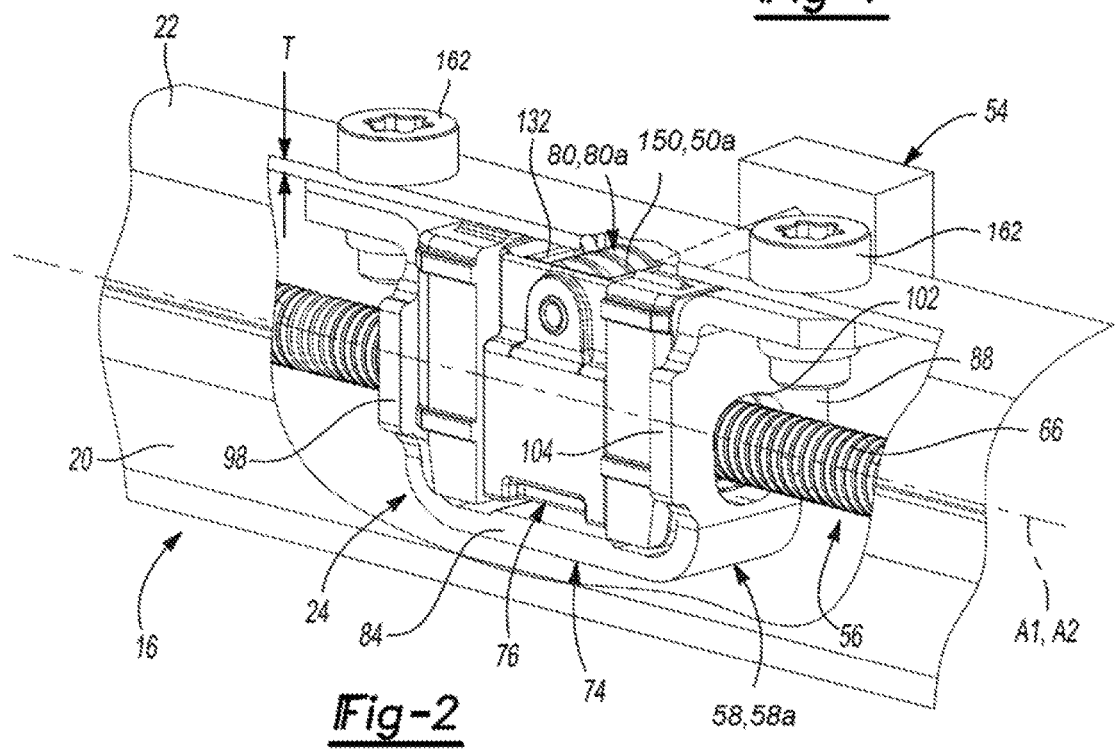
FIG. 2 is a partial perspective view of a seat track assembly, including a power seat length adjuster assembly in accordance with the principles of the present disclosure, a portion of the seat track assembly being removed for clarity.
Figure 3:
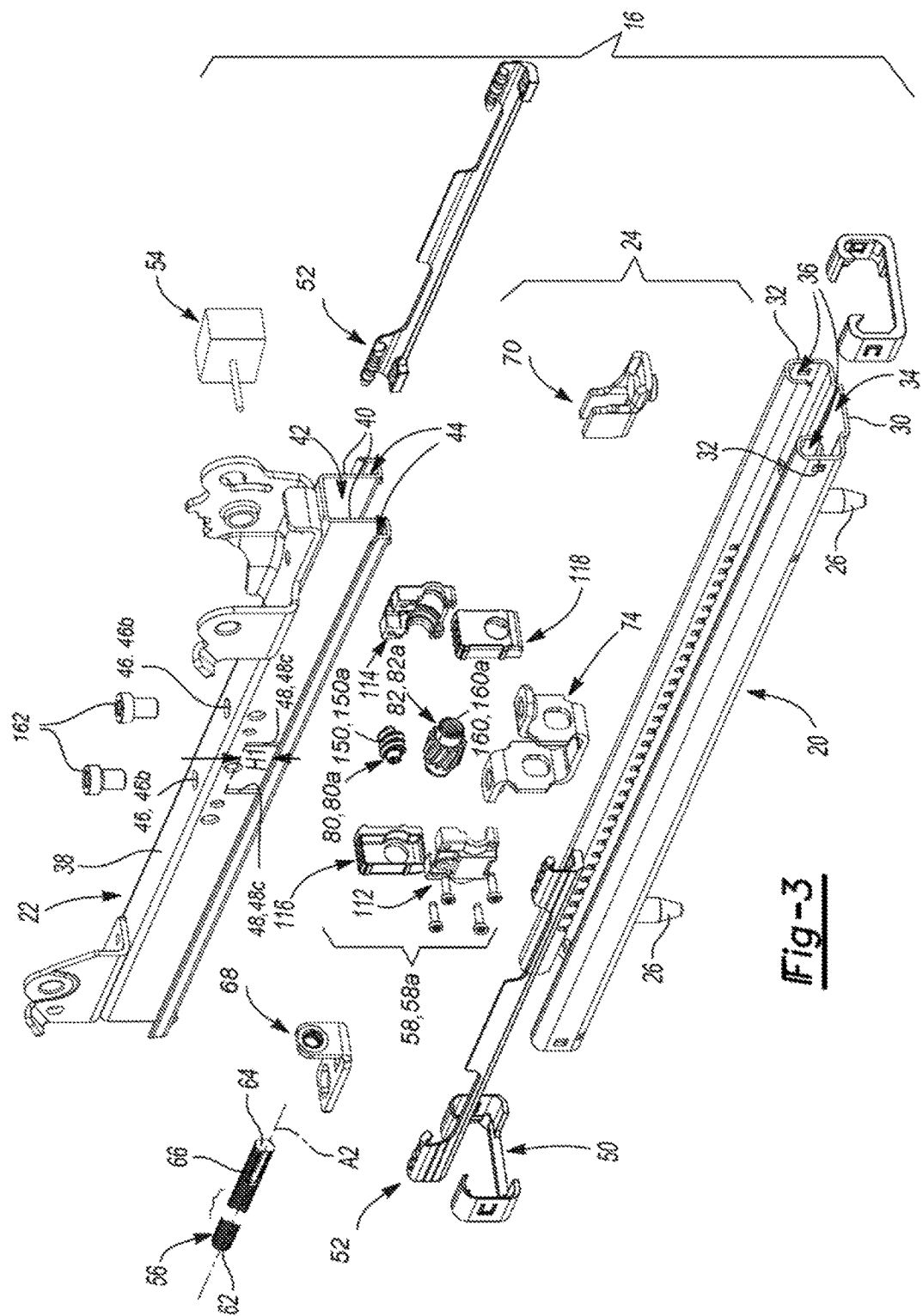
FIG. 3 is an exploded view of the seat track assembly illustrated in FIG. 2.

As illustrated in FIGS. 1-3, each seat track assembly 16 may include a lower track 20, an upper track 22, and an adjustment assembly 24. The lower track 20 may be fixedly attached to a portion of the vehicle using one or more mechanical fasteners 26 (e.g., bolts, screws, rivets, etc.), or any other suitable fastening technique, and may define an axis A1. The upper track 22 may be fixedly attached to a portion of the seat bottom 14 using one or more mechanical fasteners 28 (e.g., bolts, screws, rivets, etc.), or any other suitable fastening technique. In an assembled orientation (e.g., FIGS. 1 and 2), the lower track 20 may support the upper track 22 for translation along the axis A1, such that the upper track 22 translates relative to the vehicle. For example, the lower track 20 may slidably support the upper track 22 for translation along the axis A1.

With reference to FIG. 3, the lower track 20 may include a lower wall 30 and a pair of sidewalls 32 supported by, and extending transversely from, the lower wall 30. For example, the pair of sidewalls 32 may be integrally formed with, and extend perpendicularly from, opposed sides of the lower wall 30, such that the lower wall 30 and the sidewalls 32 cooperate to define a channel 34 extending in a direction substantially parallel to the axis A1. The sidewalls 32 may each define a U-shaped profile extending in a direction substantially parallel to the axis A1, such that each sidewall 32 defines a channel 36 extending in a direction substantially parallel to the axis A1.

The upper track 22 may include an upper wall 38 and a pair of sidewalls 40 supported by, and extending transversely from, the upper wall 38. For example, the pair of sidewalls 40 may be integrally formed with, and extend perpendicularly from, opposed sides of the upper wall 38, such that the upper wall 38 and the sidewalls 40 cooperate to define a channel 42 extending in a direction substantially parallel to the axis A1. The sidewalls 40 may each define a U-shaped profile extending in a direction substantially parallel to the axis A1, such that each sidewall 40 defines a channel 44 extending in a direction substantially parallel to the axis A1.

The upper wall 38 may include a first pair of apertures 46 (e.g., elongate slots), and the sidewalls 40 may each include a second pair of open apertures 48 (e.g., elongate slots). Each of the first pair of apertures 46 and each of the second pairs of open apertures 48 may be in fluid communication with the channel 42. In this regard, in some implementations, each of the first pair of apertures 46 and each of the second pairs of open apertures 48 may define a through-hole extending through a thickness T (FIG. 2) of the upper wall 38 and the sidewalls 40, respectively. Centerlines of the first pair of apertures 46 may be separated from one another by a first distance along the axis A1, and the second pair of apertures 48 may be separated from one another by a second distance along the axis A1. In some implementations, the first distance is substantially equal to the second distance, such that one aperture of the first pair of apertures 46 is substantially aligned with one aperture of each of the second pair of open apertures 48, and another aperture of the first pair of apertures 46 is substantially aligned with another open aperture of each of the second pair of open apertures 48. At least one of the second pair of open apertures 48 may be an elongate slot 48 defining a height H1 extending in a direction transverse to the axis A1. As will be explained in more detail below, a portion of the adjustment assembly 24 may be disposed within the first and/or second pairs of apertures 46 in order to secure the adjustment assembly 24 relative to the upper track 20.

As described above, the upper track 22 translates relative to the lower track 20 to permit selective movement of the seatback 12 and the seat bottom 14 relative to the vehicle. For example, a portion of each sidewall 40 of the upper track 22 may be slidably disposed within one of the channels 36 of the lower track 20, and a portion of each sidewall 32 of the lower track 20 may be slidably disposed within one of the channels 44 of the upper track 22. Movement of the upper track 22 relative to the lower track 20 may be facilitated by a carriage assembly 50, including two pairs of ball-cage assemblies 52, which may be: (i) secured to the upper track 22 and/or the adjustment assembly 24, and (ii) at least partially received within the channel 34 of the lower track 20.

With reference to FIGS. 2 and 3, the adjustment assembly 24 may include a driver assembly 54, a spindle screw 56, and a length adjuster assembly 58. In an assembled configuration, a portion of the adjustment assembly 24 may be secured relative to the vehicle and another portion of the adjustment assembly 24 may be secured relative to the upper track 22 to facilitate movement of the seatback 12 and the seat bottom 14 relative to the vehicle. For example, the spindle screw 56 may be secured to the lower track 20 and/or to the vehicle floor, while the length adjuster assembly 58 may be secured to the upper track 22. Accordingly, as will be explained in more detail below, movement of the length adjuster assembly 58 relative to the spindle screw 56 causes the fore and aft movement of the upper track 22 and the seat bottom 14 relative to the lower track 20 and ultimately to the vehicle floor.

The driver assembly 54 may include an electric bi-directional motor and two flex drive shafts that transfer the speed and torque from the electric motor to the length adjuster assembly 58 to cause the movement of the length adjuster assembly 58 along the spindle screw 56 length and, thus, the fore-and-aft movement of the seat assembly 10, relative to the vehicle floor.

The spindle screw 56 may include a front end 62 and a rear end 64. In some implementations, the spindle screw 56 may define a substantially cylindrical rod defining an axis A2 extending from the front end 62 to the rear end 64, and having an outer thread 66 extending along and about the axis A2 from the front end 62 to the rear end 64. In an assembled configuration, the spindle screw 56 may be disposed within one or both of the channel 34 of the lower track 20 and the channel 42 of the upper track 22 such that the axis A2 is substantially parallel to the axis A1. The front end 62 and rear end 64 may be secured relative to the lower track 20 and/or to the vehicle floor through the studs 26 rigidly mounted on the lower track 20. For example, the front end 62 may be supported by a front spindle bracket 68 that is secured to the lower track 20 and/or to the vehicle floor, and the rear end 64 may be supported by a rear spindle bracket 70 that is also secured to the lower track 20 and/or to the vehicle floor.

With reference to at least FIGS. 4 and 5, the power seat length adjuster assembly 58 may include a support member 74, a two-parts split housing assembly 76, a pair of thrust washers 77 each having an axially protruding tab 79, a pair of bearing bushings 78, a cylindrical worm 80 having helical outer threads 150 in mesh with external teeth 160 of a helical gear 82, a spindle nut integrally formed with the helical gear body 82 and having internal threads 158, and the spindle screw 56 with external thread 66 engaging the internal threads 158 of the spindle nut.

The support member 74 having a U-shape may include a base 84, a proximal arm 86, a distal arm 88, a proximal leg 90, and a distal leg 92. The proximal and distal arms 86, 88 may be supported by, and extend transversely from, the base 84. For example, the proximal and distal arms 86, 88 may be integrally formed with, and extend perpendicularly from, opposed ends of the base 84, such that the base 84 and the proximal and distal arms 86, 88 cooperate to define a channel 94. The proximal arm 86 may include a proximal aperture 96, a lateral ear 98, and a medial ear 100. Similarly, the distal arm 88 may include a distal aperture 102, a lateral ear 104, and a medial ear 106. In the assembled configuration, the proximal and distal apertures 96, 102 may be aligned with the axis A1. The lateral and medial ears 98, 100 may be supported by, and extend transversely from, the proximal arm 86. For example, the lateral and medial ears 98, 100 may be integrally formed with, and extend perpendicularly from, opposed sides of the proximal arm 86 by a distance X1 (FIG. 4). In some implementations, the distance X1 may be substantially equal to the thickness T of the upper wall 38 and the sidewalls 40, respectively, of the upper track 22.

The proximal and distal legs 90, 92 may be supported by, and extend transversely from, the proximal and distal arms 86, 88, respectively. For example, the proximal and distal legs 90, 92 may be integrally formed with, and extend perpendicularly from, the proximal and distal arms 86, 88, respectively, such that the proximal and distal legs 90, 92 are substantially parallel to the base 84. The proximal leg 90 may include a proximal retaining feature 108, and the distal leg 92 may include a distal retaining feature 110. In some implementations, the proximal retaining feature 108 may define a proximal aperture 108, and the distal retaining feature 110 may define a distal aperture 110.

With particular reference to FIG. 5, the housing assembly 76 may include a lateral housing cover 112 and a medial housing cover 114 made of zinc die-casting material, and two mirrored cover shells, including a proximal cover shell 116 and a distal cover shell 118. The lateral cover 112 may be substantially similar to the medial cover 114, and the proximal cover shell 116 may be substantially similar to the distal cover shell 118. Accordingly, references herein to the lateral cover 112 and the proximal cover shell 116 will be understood to apply equally to the medial cover 114 and the distal cover shell 116, respectively. The lateral cover 112 may include an aperture 120, a longitudinal recess 122, and an upper recess 124. The longitudinal recess 122 may extend from a proximal end 126 of the lateral cover 112 to a distal end 128 of the lateral cover 112. In an assembled configuration (e.g., FIGS. 2 and 4), the lateral cover 112 may be mated to the medial cover 114 such that (i) the aperture 120 of the lateral cover 112 is aligned with the aperture 120 of the medial cover 114, (ii) the recess 122 of the lateral cover 112 is aligned with the recess 122 of the medial cover 114 to cooperate to define a through-hole 130 (FIG. 4), and (iii) the recess 124 of the lateral cover 112 is aligned with the recess 124 of the medial cover 114 to cooperate to define an aperture 132 (FIG. 2) in communication with the through-hole 130.

The proximal cover 116 may include a recess 134 and an aperture 136 in communication with the recess 134, and may be formed from a resilient material having noise and vibration dampening characteristics. In some implementations, the proximal cover 116 may be formed from a polymer such as rubber, for example. In the assembled configuration, the proximal end 126 of the proximal and distal covers 116, 118 may be disposed within the recess 134 of the proximal cover 116, and the distal end 128 of the proximal and distal covers 116, 118 may be disposed within the recess 134 of the distal cover 118, such that the aperture 136 of the proximal cover 116 is aligned with the aperture 136 of the distal cover 118. In some implementations, one or more fasteners 137 (e.g., bolts or screws) may be disposed within the apertures 138 and 139 of the lateral and medial housing covers 112 and 114, respectively, to further secure the housing assembly 76. The housing assembly 76 may be coupled to the support member 74. For example, the housing assembly 76 may be disposed in a compressible secured relation within the channel 94 of the support member 74. The use of rubber cover shells 116 and 118, in compression against U-shaped bracket arms 86 and 88, will increase the damping capability of the power seat length adjuster assembly 58 in the process of vibration transmission to the seat structure.

As illustrated in FIG. 5, the bearing bushings 78 may include through-holes 140 that receive the outer bearing surfaces of helical gear 82, an annular flange 142 extending about the through-hole 140, as well as protruding features 143 for securing the bearing bushing against rotation while assembled within the housing assembly 76. As will be explained in more detail below, in the assembled configuration, each bearing bushing 78 will support both spindle nut bearing projections 145 for rotation relative to the housing assembly 76 within the through-hole 130. In order to avoid any damage to the bearing bushings contacting the interrupted end faces, while at the same time ensuring optimum support of helical gear bearing surfaces in bearing bushings of the housing plates, thrust washers 77 are inserted over the spindle nut bearing projections 145 and are placed against both end faces of the helical driven gear 82. In order to prevent the thrust washers 77 from sliding circumferentially, anti-rotation features or tabs 79 are disposed with, and engage, the helical driven gear teeth spaces. The thrust washers 77 are assembled between the annular flanges 142 and helical gear width sides such that their axial projection tabs 79 engage between two external teeth 160 of the helical gear 82. Thus, in addition to absorbing axial loads, the thrust washers 77 will not wear the bearing bushing flanges 142 during operation.

The cylindrical worm 80 may define an axis of rotation A3 extending from a proximal end 146 to a distal end 148, and may include one or more outer helical threads 150 disposed about the axis of rotation A3 between the proximal and distal ends 146, 148. In the assembled configuration (e.g., FIGS. 2 and 4), the worm 80 manufactured by an injection molding process from a plastic material such as PEEK 450G may be rotatably supported by the housing assembly 76. For example, the proximal end 146 of the worm 80 may be rotatably disposed within the aperture 120 of the lateral cover 112, and the distal end 148 of the worm 80 may be rotatably disposed within the aperture 120 of the medial cover 114, such that at least a portion of the helical thread 150 is disposed within, and/or visible through, the aperture 132 of the housing 76. Accordingly, the axis of rotation A3 of the worm 80 may extend in a direction transverse (e.g., perpendicular) to the axis A2 of the spindle screw 56.

As illustrated in FIG. 5, the helical gear 82 may define an axis of rotation A4 extending from a proximal end 154 to a distal end 156, and may include an inner thread 158 and a plurality of outer gear teeth 160. The inner thread 158 and the gear teeth 160 may be disposed about the axis of rotation A4. In the assembled configuration, the gear 82 may be disposed within the through-hole 130 of the housing assembly 76, such that the inner thread 158 is threaded to the outer thread 66 of the spindle screw 56, and the helical gear teeth 160 are meshed with the helical threads surfaces 149 of the cylindrical worm 80. The proximal end 154 bearing surface 143 may be disposed within the through-hole 140 of one of the bearing bushing 78, and the distal end 156 outer bearing surface 143 may be disposed within the through-hole 140 of another bearing bushing 78, such that the gear 82 is supported for rotation within the housing assembly 76. In this regard, the axis of rotation A4 may be aligned with (e.g., parallel to) the axis A2 of the spindle screw 56.

In the assembled configuration, the power length adjuster assembly 58 may be disposed within the channel 34 of the lower track 20 and/or the channel 42 of the upper track 22. In some implementations, the power length adjuster assembly 58 is supported by the upper track 22. For example, the support member 74 may engage the upper track 22. In particular, the lateral ear 98 of the proximal arm 86 may be disposed within one of the open apertures 48 of the sidewall 40 of the upper track 22, and the lateral ear 104 of the distal arm 88 may be disposed within another of the open apertures 48 of the sidewall 40 of the upper track 22. Similarly, the medial ear 100 of the proximal arm 86 may be disposed within one of the open apertures 48 of the sidewall 40 of the upper track 22, and the medial ear 106 of the distal arm 88 may be disposed within another of the open apertures 48 of the sidewall 40 of the upper track 22. In some implementations, the lateral ears 98, 104 and the medial ears 100, 106 may be disposed within the open apertures 48 in a clearance-fit configuration such that opposed sides of the proximal and distal arms 86, 88 abut the upper track 22. One of the apertures 46 of the upper wall 38 of the upper track 22 may be aligned with the proximal aperture 108 of the support member 74, and another of the apertures 46 of the upper wall 38 of the upper track 22 may be aligned with the distal aperture 110 of the support member 74. In some implementations, one or more fasteners 162 (e.g., a bolt, screw, pin, etc.) may be disposed within the apertures 46, 108, and/or 110 to further secure the support member 74 and the power seat length adjuster assembly 58 relative to the upper track 22. Thus, the power seat length adjuster assembly 58 provides a limitation of axial displacement of the housing assembly 76 and, further, balancing the axial loads, when subjected to a force of a predetermined magnitude.

With reference to FIGS. 6-8, another power seat length adjuster assembly 58a is illustrated. The structure and function of the power seat length adjuster assembly 58a may be substantially similar to that of the power seat length adjuster assembly 58, apart from any exceptions described below and/or otherwise shown in the figures. Accordingly, the structure and/or function of similar features will not be described again in detail. In addition, like reference numerals are used hereinafter and in the drawings to identify like features, while like reference numerals containing letter extensions (i.e., "a") are used to identify those features that have been modified.

The power seat length adjuster assembly 58a may include a longitudinally crowned worm 80a and a single-enveloping worm gear 82a. The single-enveloping worm gear 82a includes a plurality of outer gear teeth 160a, defined at least in part by a corresponding plurality of recesses 164, meshed with helical threads 150a of the longitudinally crowned worm 80a. The worm gear teeth 160a may collectively define a proximal annular surface 166 and/or a distal annular surface 168 opposite the proximal annular surface 166. In some implementations, the proximal and/or distal annular surfaces 166, 168 extend radially and continuously about the axis of rotation A4. In the assembled configuration, the worm gear 82a may be disposed within the through-hole 130 of the housing assembly 76, such that the annular surfaces 166, 168 engage the housing 76 through the bearing bushings 78 that are not rotating inside the apertures of the lateral and medial covers 112, 114.

As illustrated in FIG. 8, the power seat length adjuster assembly 58a includes an orthogonal crossed-axis gear drive including the worm 80a with its threads 150a extending along, and about, the axis of rotation A3, and meshed with the teeth 160a of the single-enveloping worm gear 82a, having its axis of rotation A4. Each recess 164 is defined by a single, continuous crescent surface having a radially extending dimension Z, an axially extending dimension Y, and a circumferentially extending dimension C. The teeth 160a height is defined by maximum outer and minimum root diameters Da2 and Df2, respectively.

The teeth 160a of the single-enveloping worm gear 82a are generated using an oversized hob such that the instant theoretical contact with the worm threads 80a is a point contact. A gear drive with such a contact exhibits less sensitivity to manufacturing and assembly errors and, thus, reduced vibrations and noise. In order to further improve the contact localization on the worm gear tooth surface, and finally the efficiency of such a gear drive, a longitudinal crowning is applied to the worm 80a thread surfaces 149a. The side end faces of the space between the teeth 160a of the single-enveloping worm gear 82a defines uninterrupted, continuous annular surface 166 and 168 at both ends, thus eliminating the need for thrust washers 77 in the power seat length adjuster assembly 58a, and further eliminating the need for a deburring operation in a process of manufacturing the single-enveloping worm gear 82a. As such, undesirable noise, specific for changing the direction of spindle nut axial travel along the spindle screw axis can be also eliminated. Further, the robustness of the teeth 160a under bending loads is improved and the mass and the cost of the power seat length adjuster assembly 58a is reduced.

As shown in FIG. 9, compared to the cylindrical shape 151 of a classical worm pitch surface, the pitch surface of longitudinally crowned worm 80a deviates from a cylindrical shape, having a slightly barrel shape with an arcuate profile 152, more often parabolic and symmetric relative to the centerline 153 of the worm thread length. For example, the pitch surface is similar to the pitch surface of the oversized hob used in manufacturing the single-enveloping worm gear 82a. The maximum amount of crowning δmax is on the order of a couple of tens of micrometers (i.e., 10-30 micrometers), enough to provide the necessary shift of bearing contact pattern on the mating worm gear tooth surface towards its center and, thus, avoiding an unwanted edge contact and improving the lubrication mechanism under the load.

The worm 80a may be manufactured from a plastic material, such as PEEK 450G, by an injection molding process that allows also for its thread surfaces 150a to be longitudinally crowned through the hollow mold surface shape. Longitudinal crowning of the worm 80a also provides a parabolic function of negative transmission errors, such that worm gear flanks lag with respect to the worm threads 150a, thus being able to absorb the linear functions of transmission errors and reduce the vibrations in operation. The proper values for worm parabolic crowning, as well as for the ratio of the oversized pitch diameter to the worm pitch diameter, have been determined through a detailed computerized calculation and simulation of manufacturing process and contact analysis, described in more detail below, with the goal of reducing the transmission errors and achieving an optimized bearing contact that allows for a maximum possible efficiency.

As illustrated in FIG. 10-12 the single-enveloping worm gear 82a may be economically and quickly manufactured from a metallic material (e.g., steel) utilizing an oversized hob 170, by a cutting process on a conventional hobbing machine-tool 172, using a radial infeed Sr. For example, the recesses 164 of the single-enveloping gear 82a, having internal thread 158 and its outer diameter Da2, may be formed by radially feeding an oversized hob 170 of an outer diameter dah into the worm gear blank 174, in a direction 176 perpendicular to the axis of rotation A4. During the hob travel to the worm gear tooth full depth (e.g. the diameter Df2), at an infeed rate Sr [mm/rot], both the hob 170 and the worm gear blank 174 are rotating about their axes of rotation Ah and A4, respectively, with angular speeds nh and nwg, respectively. These speeds are time synchronized through the hobbing machine kinematics such that nh/nwg=Nwg/Nh=$i_{12}$, where, Nw, Nwg and $i_{12}$ are the number of starts or threads of the oversized hob, the number of teeth of the worm gear to be cut and, the gear ratio of the functional gear drive, respectively. Using an oversized hob with its pitch diameter greater that the pitch diameter of the functional worm, allows for an increased radius of curvature of the worm gear tooth, causing the tooth bearing contact to be concentrated in the center region of the worm gear teeth surface.

The process of the worm gear tooth hobbing using an oversized hob is equivalent to a worm profile crowning with respect to the hob, allowing for a point contact between the thread 150a of the worm 80a and flank of the teeth 160a of the worm gear 82a, instead of a line contact. The direction of hob axis Ah is inclined at an angle Δ relative to the direction of worm axis A3, in a plane parallel to the plane tangent to both worm gear 82a and oversized hob 170 pitch cylinders, due to the difference between the pitch diameters, and implicitly outer diameters dah and da1 of hob 170 and functional worm 80a, respectively. Thus, in the process of cutting the recesses 164 of a left or right-hand single-enveloping worm gear teeth 160, the hob 170 is set up in the proper positions 178 or 180 such that the hob axis AhL or AhR is inclined at an angle ΔL or ΔR relative to the projection 182 of the worm axis A3 passing through a point 184. This point 184 is the intersection between the direction 176 of the worm gear width centerline and the direction 179 of hob width centerline.

The initial setup positioning, outside of the worm gear blank to be cut, of the oversized hob 170 relative to the worm gear 82a blank centered on the hobbing machine-tool 172 rotating table support 186 is done using a machine-tool vertical sliding table 188, a transversal sliding table 190a, and a cradle angular table 192. The radial infeed Sr of the hob is performed along the direction 176, by a machine-tool slidable mount 194.

Using an oversized hob allows for a more robust tool design with a longer life expectancy and an increased quality of the worm gear cut teeth surfaces while a hob design with a greater number of flutes is possible. As such, the mesh efficiency of such a gear drive subassembly mounted at the functional center distance CD and illustrated in FIG. 13A, including the worm 80a having its threads 150a longitudinally crowned, and meshed with the teeth 160a of a single-enveloping worm gear 82a cut by an oversized hob, is estimated in the range of 80-85%. For comparison purpose, the mesh efficiency of a similar crossed-helical gear drive subassembly with the same gear ratio and dimensions, mounted at the functional center distance CD and illustrated in FIG. 13B, including the cylindrical worm 80 having its threads 150 meshed with the teeth 160 of mating helical gear drive 82, is estimated in the range of 65-70%. In addition, by increasing the gear drive mesh efficiency, a small electric motor may be used to drive the assembly, with implications on lowering the cost of the power seat length adjuster assembly 58a.

The theoretical point contact sought by meshing a cylindrical worm thread having its surface 149 not crowned, with the teeth 160a of its mating single-enveloping worm gear 82a cut by an oversized hob under the load, becomes an ellipse-shaped bearing contact pattern 196, spread over a significant region on the worm gear tooth surface, as illustrated in FIG. 14A. In order to localize, as dimension and position, the bearing contact pattern to a limited central region 196a of the worm gear tooth surface, as illustrated in FIG. 14B, a supplemental longitudinally crowning is applied to the worm thread surface 149a, as described earlier. Such a localized contact pattern around the pitch point optimal mesh allows for decreasing gear drive sensibility to components manufacturing, assembly, and elastic deformations, increasing precision and gear drive load capacity, reducing the friction in operation, improving lubrication conditions, and avoiding non-uniform wear of component flanks in contact.

With reference to FIGS. 15 and 16, another power seat length adjuster assembly 58b is illustrated. The structure and function of the power seat length adjuster assembly 58b may be substantially similar to that of the power seat length adjuster assembly 58, apart from any exceptions described below and/or otherwise shown in the figures. Accordingly, the structure and/or function of similar features will not be described again in detail. In addition, like reference numerals are used hereinafter and in the drawings to identify like features, while like reference numerals containing letter extensions (i.e., "b") are used to identify those features that have been modified.

The power seat length adjuster assembly 58b may include the longitudinally crowned worm 80a, the single-enveloping worm gear 82a, and a pair of support members 74b. The support members 74b may each include the lateral ear 98, the medial ear 100, and a retaining feature 108b. In some implementations, the retaining feature 108b may define an elongated pin portion 108b extending from each support member 74b. In the assembled configuration, one of the elongate apertures 46b of the upper wall 38 of the upper track 22 may be aligned with the pin portion 108b of a first of the support members 74b, and another of the elongate apertures 46b of the upper wall 38 of the upper track 22 may be aligned with the pin portion 108*b* of the second of the support members 74*b*. In some implementations, the pin portions 108*b* may be disposed within the apertures 46*b* in a slide-fit configuration such that the support members 74*b* abut the upper track 22. The elongated pin portion 108*b* is fastened to the upper wall 38 of the upper track 22 by an orbital riveting process or by a laser welding process as indicated in FIG. 15 by 200. As such, the support subassembly formed by members 74*b* allows for securing the housing 76 in a compressive relation to the upper track 22 and, ultimately, to the power seat length adjuster assembly 58*b*.

In the assembled configuration, the power length adjuster assembly 58*b* may be disposed within the channel 34 of the lower track 20 and/or the channel 42 of the upper track 22. In some implementations, the power length adjuster assembly 58*b* is supported by the upper track 22. For example, the support member 74*b* may engage the upper track 22. In particular, the lateral ear 98 of the proximal arm 86 may be disposed within one of the open apertures 48 of the sidewall 40 of the upper track 22, and the lateral ear 104 of the distal arm 88 may be disposed within another of the open apertures 48 of the sidewall 40 of the upper track 22. Similarly, the medial ear 100 of the proximal arm 86 may be disposed within one of the open apertures 48 of the sidewall 40 of the upper track 22, and the medial ear 106 of the distal arm 88 may be disposed within another of the open apertures 48 of the sidewall 40 of the upper track 22. In some implementations, the lateral ears 98, 104 and the medial ears 100, 106 may be disposed within the open apertures 48 in a clearance-fit configuration such that opposed sides of the proximal and distal arms 86, 88 abut the upper track 22. Thus, the power seat length adjuster assembly 58*b* provides a limitation of axial displacement of the housing assembly 76, and further, balancing the axial loads when subjected to a force of a predetermined magnitude.

A method of assembling the power length adjuster assembly 58*b* to the upper track 22 may include, in this succession: (i) coupling the pair of support members 74*b* to the upper track 22, (ii) coupling the housing 76 in a compressive relation between the support members 74*b* in a friction-fit orientation, and (iii) coupling the lead screw 56 to the power length adjuster assembly 58*b* in a direction parallel to A1. Coupling the housing 76, to the pair of support members 74*b* may include applying a force on the housing 76 with the pair of support members 74*b* in a direction extending substantially parallel to the axis A1.

With reference to FIGS. 17 and 18, another power seat length adjuster assembly 58*c* is illustrated. The structure and function of the power seat length adjuster assembly 58*c* may be substantially similar to that of the power seat length adjuster assembly 58, apart from any exceptions described below and/or otherwise shown in the figures. Accordingly, the structure and/or function of similar features will not be described again in detail. In addition, like reference numerals are used hereinafter and in the drawings to identify like features, while like reference numerals containing letter extensions (i.e., "c") are used to identify those features that have been modified.

The power seat length adjuster assembly 58*c* may include the longitudinally crowned worm 80*a*, the single-enveloping worm gear 82*a*, and a pair of support members 74*c*. The support members 74*c* may each include a lateral ear 98*c* and a medial ear 100*c*. In the assembled configuration, the lateral ear 98*c* of each support member 74*c* may be disposed within one of the closed elongated apertures 48*c* of the sidewall 40 of the upper track 22, and the medial ear 100*c* of each support member 74*c* may be disposed within one of the closed elongated apertures 48*c* of the sidewall 40 of the upper track 22, such that the upper track 22 and an upper side 178 of the support member 74*c* define a gap or void 202 therebetween. In this regard, the support member 74*c* may define a height H2 extending from the upper side 108*c* to a lower side 204, opposite the upper side 108*c*. In some implementations, the height H2 may be less than the height H1 of the open aperture 48. Once the support members 74*c* are disposed within the closed apertures 48*c* in a clearance-fit configuration such that opposed sides of the lateral ear 98*c* and a medial ear 100*c* abut the upper track 22, the support members 74*c* are laser welded to the sidewall 40 at both ends.

A method of assembling the power length adjuster assembly 58*c* to the upper track 22 may include, in this succession: (i) coupling the pair of support members 74*c* to the upper track 22, (ii) coupling the housing 76 in a compressive relation between the support members 74*c* in a friction-fit orientation, and (iii) coupling the lead screw 56 to the power length adjuster assembly 58*c* in a direction parallel to A1. Coupling the pair of support members 74*c* to the upper track 22 may include: (i) translating each support member 74*c* through one of the closed elongated apertures 48*c* and into the channel 42 in a first direction perpendicular to the axis A1, and (ii) translating each support member 74*c* within the channel 42 in a second direction perpendicular to the axis A1 and perpendicular to the first direction. In some implementations, translating each support member 74*c* in the first direction may occur before translating each support member 74*c* within the channel 42 in the second direction. Coupling the housing 76, to the pair of support members 74*c* may include applying a force on the housing 76 with the pair of support members 74*c* in a direction extending substantially parallel to the axis A1.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A seat adjustment assembly comprising:
   a housing;
   a worm disposed within the housing for rotation about a first axis and having a helical thread defining an arcuate profile extending along the first axis;
   a gear disposed within the housing for rotation about a second axis and meshingly-engaged with the worm; and
   a rail extending through the housing and the gear for rotation about a third axis, the rail being meshingly-engaged with the gear.

2. The seat adjustment assembly of claim 1, wherein the gear includes an inner thread and the rail includes an outer thread meshingly-engaged with the inner thread.

3. The seat adjustment assembly of claim 2, wherein the helical thread defines a first diameter, a second diameter, and a third diameter disposed between the first diameter and the second diameter relative to the first axis.

4. The seat adjustment assembly of claim 3, wherein the third diameter is greater than the first diameter and the second diameter.

5. The seat adjustment assembly of claim 1, wherein the housing includes a proximal cover formed from a resilient material and having an aperture, the rail being rotatably disposed within the aperture.

6. The seat adjustment assembly of claim 1, further comprising at least one support member engaging the housing.

7. The seat adjustment assembly of claim 6, wherein the at least one support member defines a U-shaped construct having a channel, the housing being disposed within the channel in a friction-fit configuration.

8. The seat adjustment assembly of claim 6, wherein the at least one support member includes a first support member and a second support member, the housing being disposed between the first support member and the second support member in a friction-fit configuration.

9. The seat adjustment assembly of claim 6, wherein the at least one support member includes a laterally-extending ear portion and a medially-extending ear portion.

10. The seat adjustment assembly of claim 1, wherein the gear includes a plurality of recesses defining a corresponding plurality of gear teeth.

11. The seat adjustment assembly of claim 10, wherein the plurality of gear teeth define at least one continuous radially-extending surface configured to slidably engage the housing.

12. The seat adjustment assembly of claim 10, wherein the gear includes a proximal annular surface and a distal annular surface formed at an opposite end of the gear from the proximal annular surface, wherein the recesses extend between the proximal annular surface and the distal annular surface.

13. The seat adjustment assembly of claim 1, further comprising a bushing supported by the housing and rotatably coupled to the gear, the bushing having an anti-rotation feature configured to inhibit rotation of the bushing relative to the housing.

14. The seat adjustment assembly of claim 1, wherein the worm is formed at least in part from a PEEK material.

15. The seat adjustment assembly of claim 1, further comprising a first track and a second track translatably engaging the first track.

16. The seat adjustment assembly of claim 15, further comprising a support member engaging the housing and including a retaining feature aligned with an upper aperture of the second track.

17. The seat adjustment assembly of claim 16, wherein the retaining feature includes a pin portion mounted within the upper aperture.

18. The seat adjustment assembly of claim 17, wherein the pin portion is mounted within the upper aperture by means of riveting.

19. The seat adjustment assembly of claim 17, wherein the pin portion is mounted within the upper aperture by means of welding.

20. A seat adjustment assembly for a track assembly having a first track and a second track translatably engaging the first track, the seat adjustment assembly comprising:
   a housing;
   a worm disposed within the housing for rotation about a first axis and having a helical thread defining an arcuate profile extending along the first axis;
   a gear disposed within the housing for rotation about a second axis and meshingly-engaged with the worm;
   a spindle screw extending through the housing and the gear for rotation about a third axis, the spindle screw being meshingly-engaged with the gear; and
   a support member engaging the housing and including a retaining feature aligned with an upper aperture of the second track, wherein the retaining feature includes a pin portion mounted within the upper aperture by means of riveting or welding.

* * * * *